United States Patent
Keefe

(10) Patent No.: US 8,367,960 B2
(45) Date of Patent: Feb. 5, 2013

(54) PROCESS FOR RAIL RESTORATION AND RAIL MANUFACTURE USING WELDING

(75) Inventor: Rod Keefe, Jacksonville, FL (US)

(73) Assignee: CSX Transportation, Jacksonville, FL (US)

(*) Notice: Subject to any disclaimer, the term of this patent is extended or adjusted under 35 U.S.C. 154(b) by 43 days.

(21) Appl. No.: 13/154,036

(22) Filed: Jun. 6, 2011

(65) Prior Publication Data

US 2011/0297752 A1 Dec. 8, 2011

Related U.S. Application Data

(60) Provisional application No. 61/351,539, filed on Jun. 4, 2010.

(51) Int. Cl.
*B23P 6/00* (2006.01)
*B23K 9/00* (2006.01)

(52) U.S. Cl. ............ 219/54; 29/402.04; 29/402.05; 29/402.07; 29/402.09; 29/402.11; 29/402.13; 29/402.19; 29/402.21; 29/458; 29/525.14; 29/527.2; 148/569; 148/581; 148/584

(58) Field of Classification Search ........ 29/402.04, 29/402.05, 402.06, 402.07, 402.09, 402.11, 29/402.13, 402.19, 402.21, 458, 525.14, 29/527.1, 527.2; 148/526, 527, 528, 529, 148/569, 581, 584; 219/54
See application file for complete search history.

(56) References Cited

U.S. PATENT DOCUMENTS

| | | | |
|---|---|---|---|
| 1,607,118 | A | 11/1926 | Delachaux |
| 1,933,139 | A | 10/1933 | Daley |
| 1,976,526 | A | 10/1934 | Tracey |
| RE19,764 | E | 11/1935 | Frickey |
| 2,170,859 | A | 8/1939 | Frickey |
| 3,623,207 | A | 11/1971 | Zoso et al. |
| 3,708,856 | A | 1/1973 | Keiffer |
| RE32,979 | E | 7/1989 | Panetti |
| 4,875,657 | A | 10/1989 | Moller et al. |
| 4,878,318 | A | 11/1989 | Panetti |
| 4,920,701 | A | 5/1990 | Panetti |
| 5,134,808 | A | 8/1992 | Panetti |
| 5,992,329 | A | 11/1999 | Scheuchzer et al. |

(Continued)

FOREIGN PATENT DOCUMENTS

| | | | |
|---|---|---|---|
| GB | 2118579 A | * | 11/1983 |
| JP | 61199582 A | * | 9/1986 |

(Continued)

OTHER PUBLICATIONS

International Search Report and Written Opinion in Application No. PCT/US2011/039276 filed Jun. 6, 2011.

*Primary Examiner* — Jermie Cozart

(74) *Attorney, Agent, or Firm* — McGuireWoods LLP

(57) ABSTRACT

A method for restoring a worn rail section includes cleaning a worn surface of a rail section to expose a clean metal surface, heating the rail section to a first temperature before welding, welding new metal on the clean metal surface of the rail section after heating the rail section to the first temperature, heating the rail section to a second temperature after the welding to heat-treat a heat-affected area caused by the welding, and shaping the rail section, wherein the welding is performed by a gas metal arc welding (GMAW) process.

18 Claims, 10 Drawing Sheets

U.S. PATENT DOCUMENTS

| | | | |
|---|---|---|---|
| 6,166,347 A * | 12/2000 | Morlock | 219/54 |
| 6,168,676 B1 | 1/2001 | Seguin | |
| 6,278,074 B1 * | 8/2001 | Morlock et al. | 219/54 |
| 6,515,249 B1 | 2/2003 | Valley et al. | |
| 6,886,470 B2 | 5/2005 | Norby et al. | |
| 2002/0094762 A1 | 7/2002 | Mathison et al. | |
| 2004/0231763 A1 * | 11/2004 | Kuppers et al. | 148/581 |
| 2006/0185145 A1 * | 8/2006 | Moore et al. | 29/402.08 |
| 2007/0007251 A1 | 1/2007 | Kral et al. | |

FOREIGN PATENT DOCUMENTS

| | | | |
|---|---|---|---|
| JP | 01180780 A * | 7/1989 | |
| JP | 5169292 | 7/1993 | |
| KR | 10-0762940 B1 | 10/2007 | |

* cited by examiner

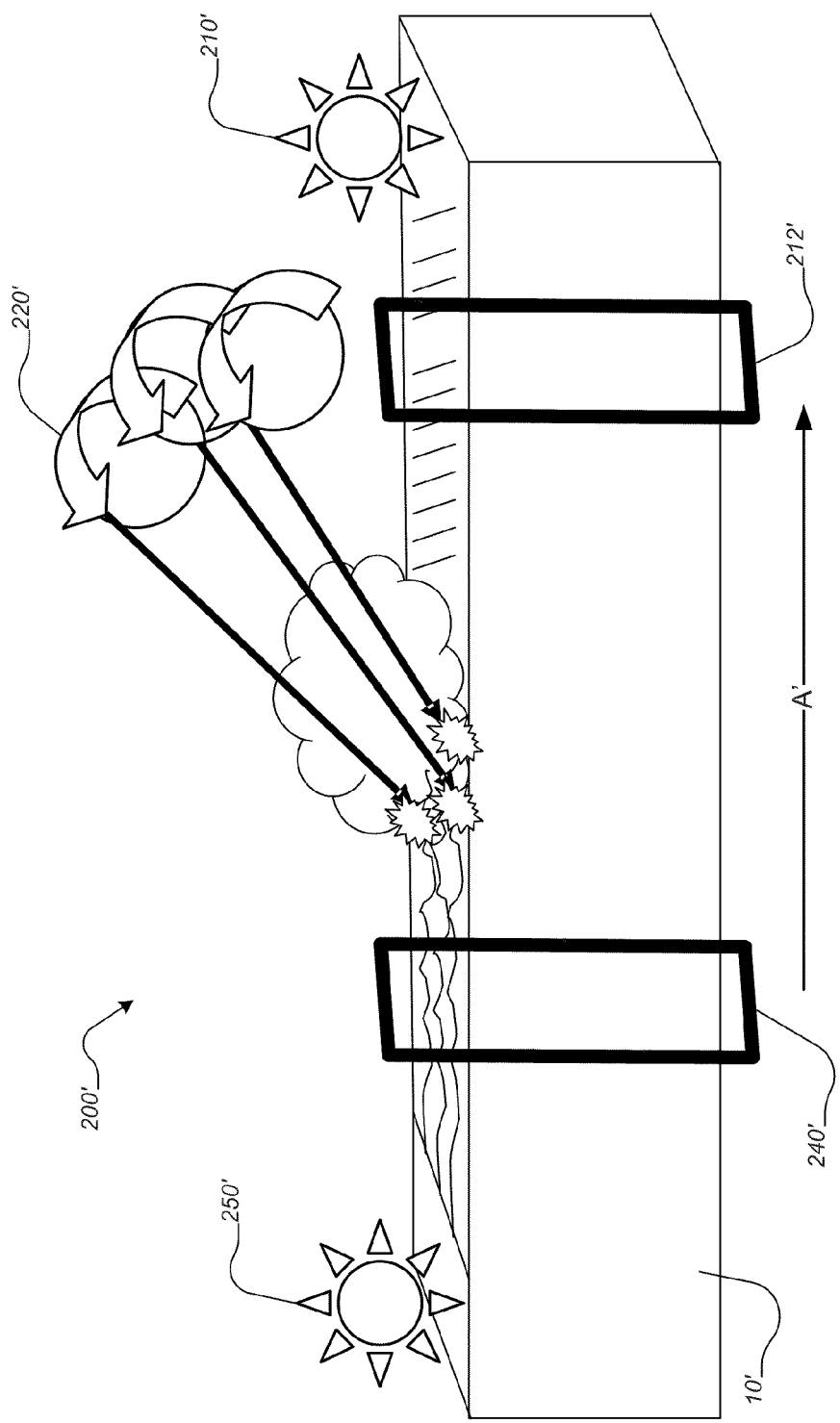

PROCESS FOR RAIL RESTORATION AND RAIL MANUFACTURE USING WELDING

CROSS REFERENCE TO PRIOR APPLICATIONS

This application claims the benefit of U.S. Provisional Application No. 61/351,539 filed on Jun. 4, 2010, which is hereby incorporated by reference in its entirety for all purposes as if fully set forth herein.

FIELD OF THE DISCLOSURE

This disclosure is directed to a process and apparatus for restoring or manufacturing rails, and particularly to restoring worn rails and making new rails using in part a welding process and heat treatment to achieve better physical properties.

BACKGROUND OF THE DISCLOSURE

Rails, such as tee rails and/or the like, used for railroad tracks suffer abrasion and wear, particularly at curves, switch points, guard rails, stock rails and/or the like, due to rolling abrasive contact with train wheels. Once an amount of wear in a rail exceeds limits set by regulations, industry recommendations, company operation policies, and/or the like, it becomes necessary to replace the rail. Although welding of rail ends has been successfully achieved for decades, no attempt to rebuild or restore the worn surface of rails in a longitudinal fashion has been attempted because rail restoration is very often adverse to the commercial interests in the rail industry. For example, rail restoration may negatively affect rail manufacturers revenues and profits. Also, the manufacturers of welding equipment, such as, e.g., flashbutt welding machines, thermit welding equipment and/or the like, are more interested in providing welders, materials and/or the like to weld rail ends of new rails. However, rail-based transportation service companies may benefit from rail restoration or new rails with better physical properties, such as, e.g., extended asset life, reduced operational cost and and/or the like. Such companies will also benefit from rails that are more wear resistant and do not need to be replaced or restored as often.

Accordingly, there is a need for efficient and effective rail manufacture and/or restoration.

SUMMARY OF THE DISCLOSURE

According to an aspect of the disclosure, a method for restoring a worn rail section includes cleaning a worn surface of a rail section to expose a clean metal surface, heating the rail section to the first temperature before welding, welding new metal on the clean metal surface of the rail section after heating the rail section to the first temperature, heating the rail section to the second temperature after the welding to heat-treat a heat-affected area caused by the welding, and shaping the rail section, wherein the welding is performed by a gas metal arc welding (GMAW) process.

The first temperature may be between about 800° F. and about 1000° F. The shaping may include establishing one of a like-new profile and a worn wheel profile. The welding may be performed by pulsed-spray GMAW (P-GMAW). The cleaning may include at least one of grinding and milling to expose the clean metal surface that is free of cracks and profile discontinuities. A rail may be constructed by the method.

The welding may include applying a plurality of longitudinal layers of continuous weld metal in stacks on the clean metal surface of the rail section. The second temperature may be about 1100° F. The heating after the welding may be performed substantially immediately after the welding. The heating after the welding may be localized to a portion of a surface of the rail section where the plurality of longitudinal layers are stacked. A hardness of the heat-affected area after the heating after the welding is about 410 HB to about 450 HB. The heating after the welding may include heating the rail section with an induction coil configured to selectively heat the portion of the surface of the rail section where the plurality of longitudinal layers are stacked.

The method may further include inspecting a plurality of rail sections to identify a worn rail section for restoration. The method may further include removing and transporting the worn rail section to a restoration facility for restoration. The method may further include dispatching a mobile restoration unit to a rail track having the worn rail section. The mobile restoration unit may perform the cleaning, the heating before the welding, the welding, the heating after the welding and the shaping in sequence while moving along the rail track.

According to another aspect of the disclosure, a method of manufacturing a rail section includes exposing a clean metal surface of a base metal layer, the surface being free of cracks and profile discontinuities, pre-heating the base metal layer to the first temperature, welding one or more continuous metal layers on the clean metal surface of the base metal layer after the pre-heating, and post-heating the one or more continuous metal layers welded on the base metal layer at the second temperature, wherein the welding is performed by a gas metal arc welding (GMAW) process.

The post-heating may be localized to an area of the surface of the where a plurality of longitudinal layers of the continuous weld metal are stacked. The method may further include shaping to a desired rail profile. A rail may be constructed by the method.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 3B shows another apparatus for performing the restoration process shown in FIG. 2, constructed according to the principles of the disclosure.

DETAILED DESCRIPTION OF THE DISCLOSURE

Figure 1:
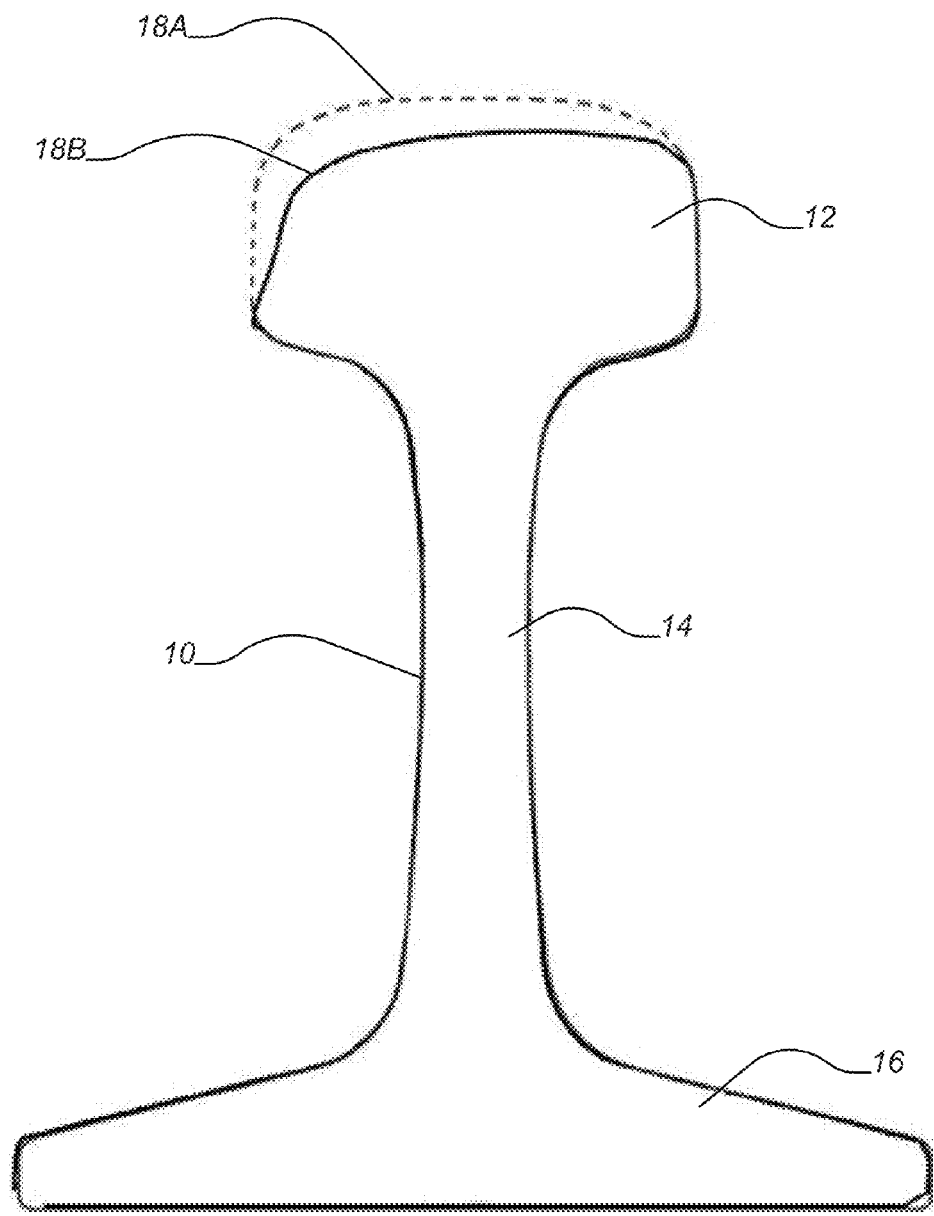
FIG. 1 shows a cross-sectional view of a rail section including a base, a neck and a rail head, wherein the rail head has a worn surface.

The embodiments of the disclosure and the various features and advantageous details thereof are explained more fully with reference to the non-limiting embodiments and examples that are described and/or illustrated in the accompanying drawings and detailed in the following description and the attachment. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The disclosure is directed to a method and an apparatus for restoring a worn rail section, such as, e.g., a rail section 10 shown in FIG. 1 or the like, which may also be applied to manufacturing new rail sections. The worn rail section 10 may be a curve-worn rail section or the like of a curved rail track and/or the like, which may have been damaged by abrasion, such as, e.g., wheel-rail interface abrasion and/or the like. The rail section 10 may include a rail head 12, a neck 14 and a base 16. The dotted line 18A indicates the original surface profile of the rail head 12. The solid line 18B indicates the worn surface profile of the rail head 12, which indicates that the rail head 12 has suffered substantial wearing at the upper and left side surface areas thereof. Of course the invention may be used on any wear location.

Figure 2:
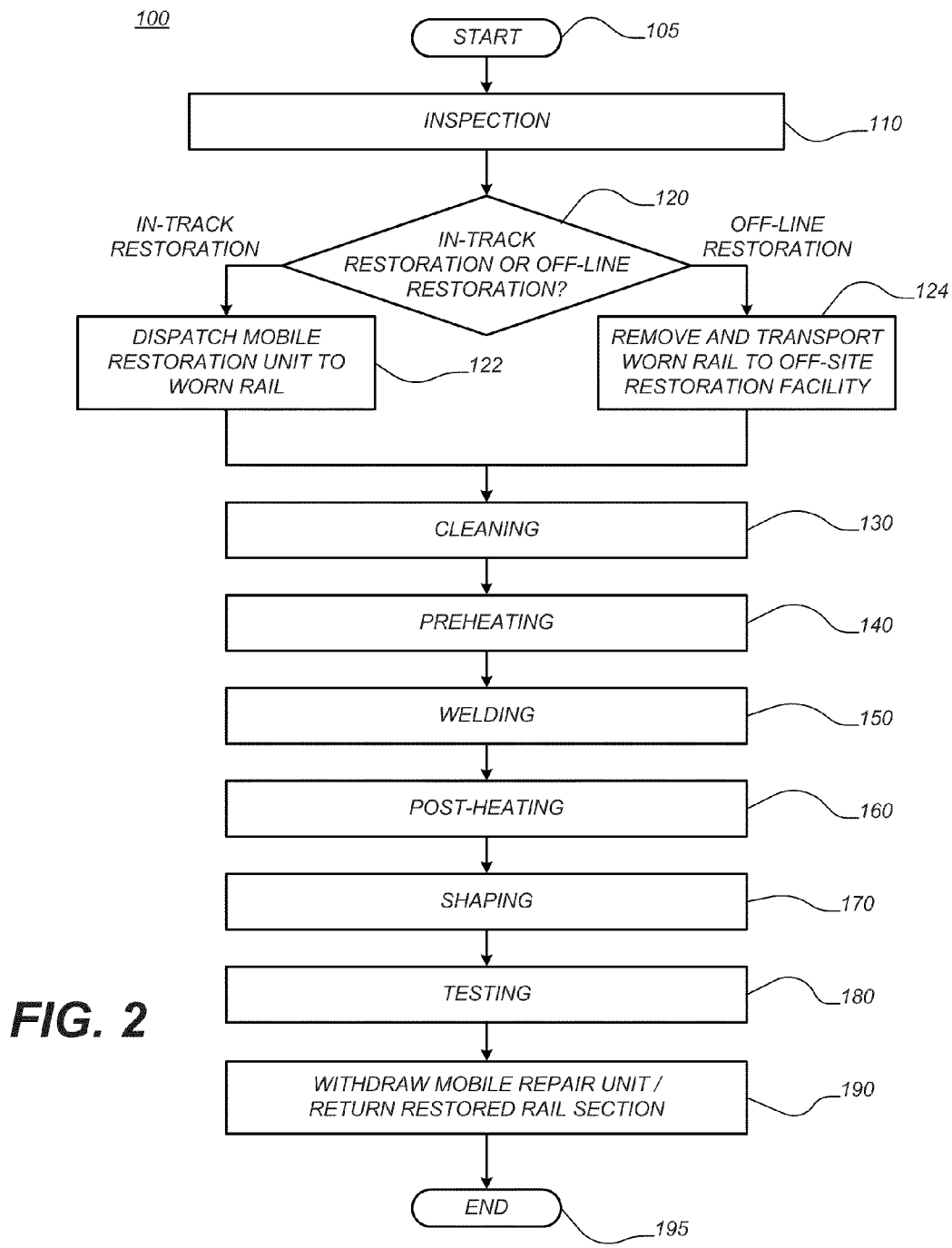
FIG. 2 shows a process for restoring a rail section having a worn surface according to the principles of the disclosure.

FIG. 2 shows a process 100 for restoring a worn rail section, such as, e.g., the rail section 10 or the like, according to the principles of the disclosure. Upon starting the process 100 (at 105), a plurality of rail sections may be inspected (at 110) to identify which rail section requires restoration. Since it may not be cost-effective to restore worn rail sections that have no or little service life left, the inspection at 110 may be focused on identifying a worn rail section having a feasible amount of a service life left. The worn rail section for restoration may be identified by various inspection methods, such as, e.g., visual inspection, computer-based automatic inspection, and/or the like, as known in the art.

Once a worn rail section having a feasible amount of a service life left is identified (at 110), it may be determined whether to restore the worn rail section at the spot (i.e., in-track restoration) or to remove and take the worn rail section to an off-track restoration facility (i.e., off-line restoration) (at 120). Such determination may be made based on various factors, such as, e.g., traffic density at the spot, a number of tracks at the spot, damage extent/severity of the worn rail section and/or the like. For example, when there are more than two tracks, it may be possible to block one rail track for restoration while diverting all the traffic to another rail track. In this case, the worn rail section may be removed from the rail track and transported to a nearby or remote restoration facility for restoration. However, when there is only one rail track and/or timely restoration is required, the worn rail section may be restored at the spot.

When it is determined to restore the worn rail section at a nearby or remote restoration facility (off-line restoration at 120), the worn rail section may be removed from the track and transported to the restoration facility (at 124). When it is determined to restore the worn rail section at the spot (in-track restoration at 120), a mobile restoration unit, such as, e.g., a motile restoration unit 200 shown in FIG. 3A and/or the like, may be dispatched to restore the worn rail section at the spot (at 122). The mobile restoration unit may be mounted on a rolling vehicle, which may resemble a train. The mobile restoration unit may be configured to move along a rail track and perform the restoration process 100. The mobile restoration unit may include a plurality of rail restoration components mounted on a series of rolling vehicles. The rail restoration components may pass over the rail rack and perform the rail restoration process 100 in sequence as they traverse the worn rail section. Other transportation methods are also contemplated. For example, the mobile restoration unit may be mounted on a vehicle, such as, e.g., a van, a truck or the like, or a series of vehicles and transported to the spot for the in-track restoration.

The mobile restoration unit may include all of the necessary equipment and materials to perform the entire rail restoration process 100. For example, the mobile restoration unit may include inspection equipment, a power supply, grinding/milling equipment, heating equipment (e.g., induction heating coils and/or the like), welding equipment (e.g., a multi-head welding unit and/or the like), protection equipment (e.g., shielding gases, fire protection and/or the like), process control/monitor equipment, testing equipment, and/or the like. An exemplary embodiment of the mobile restoration unit is described below in detail with reference to FIG. 3A. The restoration facility for the off-site restoration (at 124) may be equipped with the same or similar equipment and operated in the same manner or use similar principles. A new rail manufacturing facility would have the same or similar equipment as well.

Upon dispatching the mobile restoration unit 200 (at 122) or, alternatively, removing and transporting the worn rail section to the off-site restoration facility (at 124), the worn surface of the rail section may be cleaned (at 130) by, e.g., grinding, machine-milling and/or the like, to eliminate any cracks or profile discontinuity and to form a clean and bright surface exposing stable and homogeneous metal of the rail section (at 130). Similarly, in manufacturing a new rail section, a base metal layer may be cleaned and treated to expose a clean and bright surface exposing stable and homogeneous metal that is free of any cracks or profile discontinuity. The rail resection than may be pre-heated (at 140) to an ideal temperature, such as, e.g., between about 800° F. and about 1000° F., for a period of time to ensure suitable welding quality, for metallurgy and welding, using, e.g., an inductive coil or the like.

In order to maintain the preheating temperature and/or any interpass temperature, one or more resistive heating blankets (not shown) may be placed on the web and head of the ail section. The resistive heating blankets may be, e.g., kaowool insulation blankets or the like, and may maintain the temperature of the preheated rail section at about 800° F. to about 1000° F. before and during welding. Further, run-on/run-off tabs (not shown) may be welded on the rail section to avoid weld starts/stops on the surface of the rail section. For example, the tabs may be welded at the welding feed speed (WFS) of about 150 inches per minute (IPM), the travel speed (TS) of about 35 IPM, the contact tip to work distance (CTWD) of about 0.75 inch and the preheat temperature of about 860° F. to about 903° F. The tabs may be removed after welding is completed via, e.g., machining or the like.

After the pre-heating step 140, new metal may be welded on the clean surface of the rail section (at 150). Before carrying out the welding step 150, the current rail head profile may be analyzed in order to plan welding sequences and/or adjust welding parameters in order to minimize the time and effort required for shaping the rail section in a desired rail profile. The welding may be performed via, e.g., pulsed gas metal arc welding (GMAW), resistance weld cladding (RWC), and/or the like. Other types of welding methods are also contemplated, such as, e.g., multiple-gang welding unit assemblies, multiple sequenced and controlled welding units, and/or the like, to control weld disposition and martensite development thereof. As known in the art, the GMAW process is a semi-automatic or automatic arc welding process, in which a continuous and consumable electrode wire and shielding gas are fed through a welding gun. There are several metal transfer methods in GMAW, such as, e.g., globular GMAW, short-circuiting GMAW, spray GMAW, and pulsed-spray GMAW (P-GMAW).

in an embodiment, new metal may be welded via the P-GMAW method, which uses a pulsing current to melt a consumable wire (i.e., filler wire) and allow one small molten droplet to fall with each pulse. The pulses allow the average current to be lower, decreasing the overall heat input and thereby decreasing the size of the weld pool and heat-affected zone (HAZ) while making it possible to weld thin work pieces. The pulse provides a stable arc and no spatter since no short-circuiting takes place. This also makes the process suitable for nearly all metals, and thicker electrode wire can be used as well. The smaller weld pool gives the variation greater versatility, making it possible to weld in all positions. Despite the high carbon equivalent content (CE) in the base material of the rail, the GMAW method may be carried out using the consumable wires developed by Holland Wire Products Inc™ or the like. However, it is also contemplated to develop new consumable wires, which may be very costly.

Figure 4:
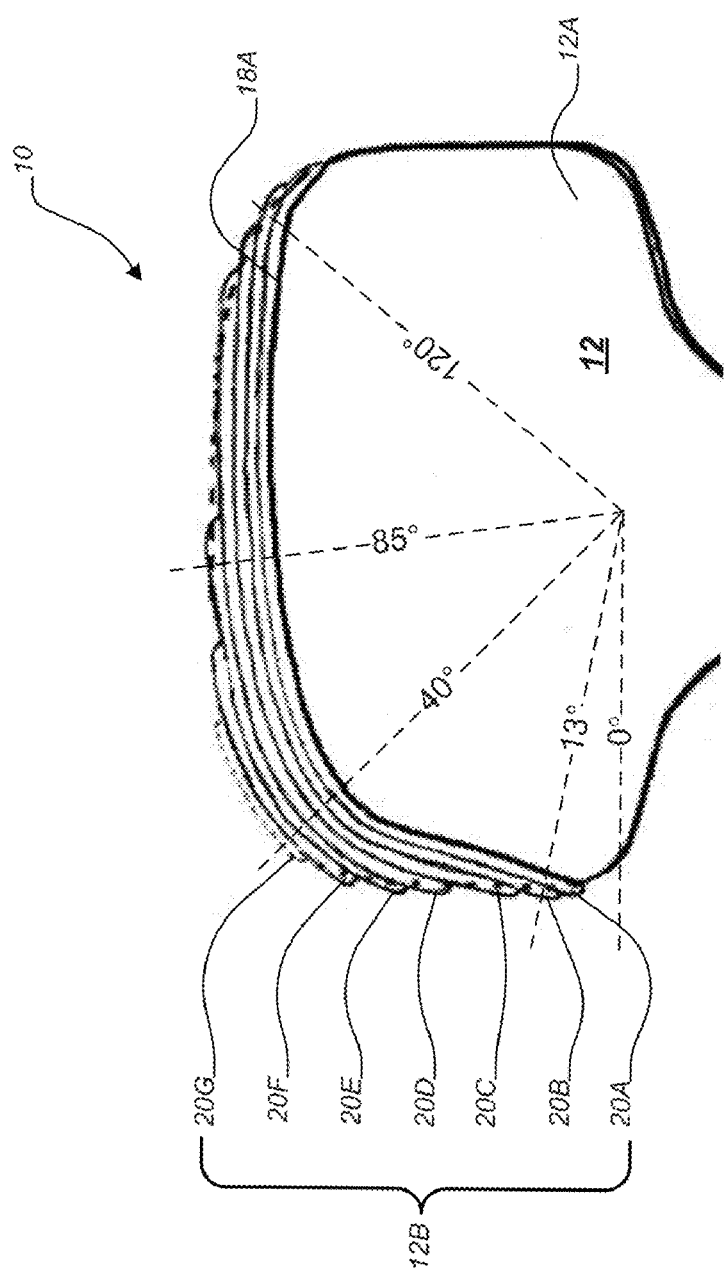
FIG. 4 shows a cross-sectional view of a rail head after welding a plurality of metal layers on a worn surface thereof according to the principles of the disclosure.

The new metal may be formed by welding or bonding a sufficient number of longitudinal continuous weld metal layers on the cleaned surface of the rail section to form a cross-section necessary for shaping a desired rail head profile. The number and shape of metal layers may vary depending on the current rail head profile and desired rail head profile. The metal layers may be adjacent and/or overlapped. The welding may be performed in a vertical and/or horizontal direction, as required by the restoration. Alternatively, a new cross-section of metal may be bonded onto the cleaned surface of the rail section. For example, FIG. 4 shows the ail head 12 of the rail section 10 shown in FIG. 4 after welding a new metal portion 12B on the upper and left surfaces of a base metal portion 12A. The new metal portion 12B may be formed by sequentially depositing seven metal layers 20, i.e., first metal layer 20A, second metal layer 20B, third metal layer 20C, fourth metal layer 20D, fifth metal 20E, sixth metal layer 20F and seventh metal layer 20G). As noted above, the new metal portion 12B may resemble the desired rail profile. Of course, more or fewer layers may be used to form the new metal portion 12B.

In an embodiment, a plurality of welding beads (not shown) may be deposited in welding the metal layers 20A, 20B, 200, 20D, 20E, 20F in the welding step 150. The welding beads may be indexed about 0.15 inch between welding passes. For the rail section 10 that is twenty (20) feet long, twenty four (24) beads may be used for the first metal layer 20A, twenty three (23) beads for the second metal layer 20B, twenty one (21) beads for the third metal layer 20C, eighteen (18) beads for the fourth metal layer 20D, ten (10) beads for the fifth metal layer 20E, seven (7) beads for the sixth metal layer 20F and four (4) beads for the seventh metal layer 20G. Thus, a total of one hundred seven (107) beads may be used for the 20-foot rail section 10. Of course, other numbers of beads may be used. The welding apparatus may be operated at the wire feed speed of about 150 IPM, the welding travel speed of about 45 IPM, the current of about 190 A to about 210 A, the voltage of about 21.5 to about 23.5 V and the CTWD of about 0.75 inch. Other operating parameters would be within the scope and spirit of the disclosure. Further, depending on locations of the weld on the rail head 12, different torch angles may be used. For example, FIG. 4 shows four different torch angels, such as, e.g., 13°, 40°, 85° and 120°.

Figure 5:
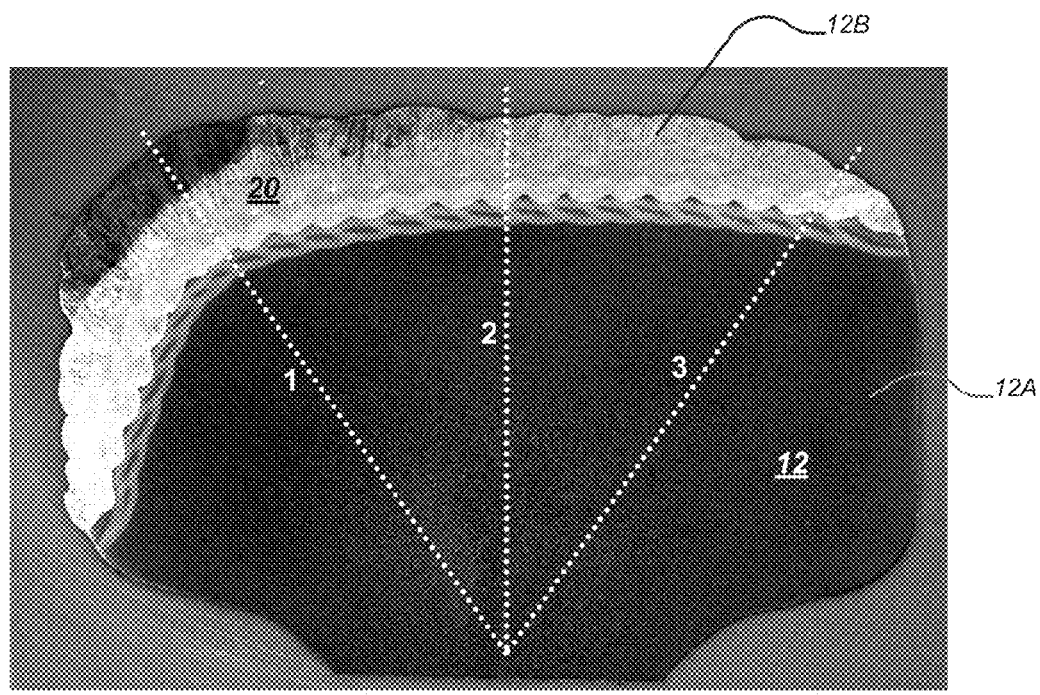
FIG. 5 shows another cross-sectional view of the rail head after welding according to the principles of the disclosure.

FIG. 5 shows a cross-sectional view of the rail head 12 after the new metal portion 12B is welded on the upper and left surfaces of the base metal portion 12A. According to the American Railway Engineering and Maintenance-of-Way Association (AREMA) guidelines, hardness of the rail head 12 is determined at a depth of equal to or less than ⅛ inch from the surface along traverse lines 1, 2, and 3. The AREMA guidelines also dictate that the hardness gradient of the rail head 12 along the traverse lines 1, 2, and 3 should be gradual towards the center of the rail without exhibiting any sharp drop or discontinuity in hardness. Further, the hardness at a depth of 0.6 inch on the traverse lines 1, 2, and 3 is required to be equal to or greater than 352 HB for high strength rails. For the low alloy head hardened rail steel grade, the hardness at a depth of ⅞ inch on the traverse lines 1, 2 and 3 is required to be equal to or greater than 341 HB.

Figure 6A:
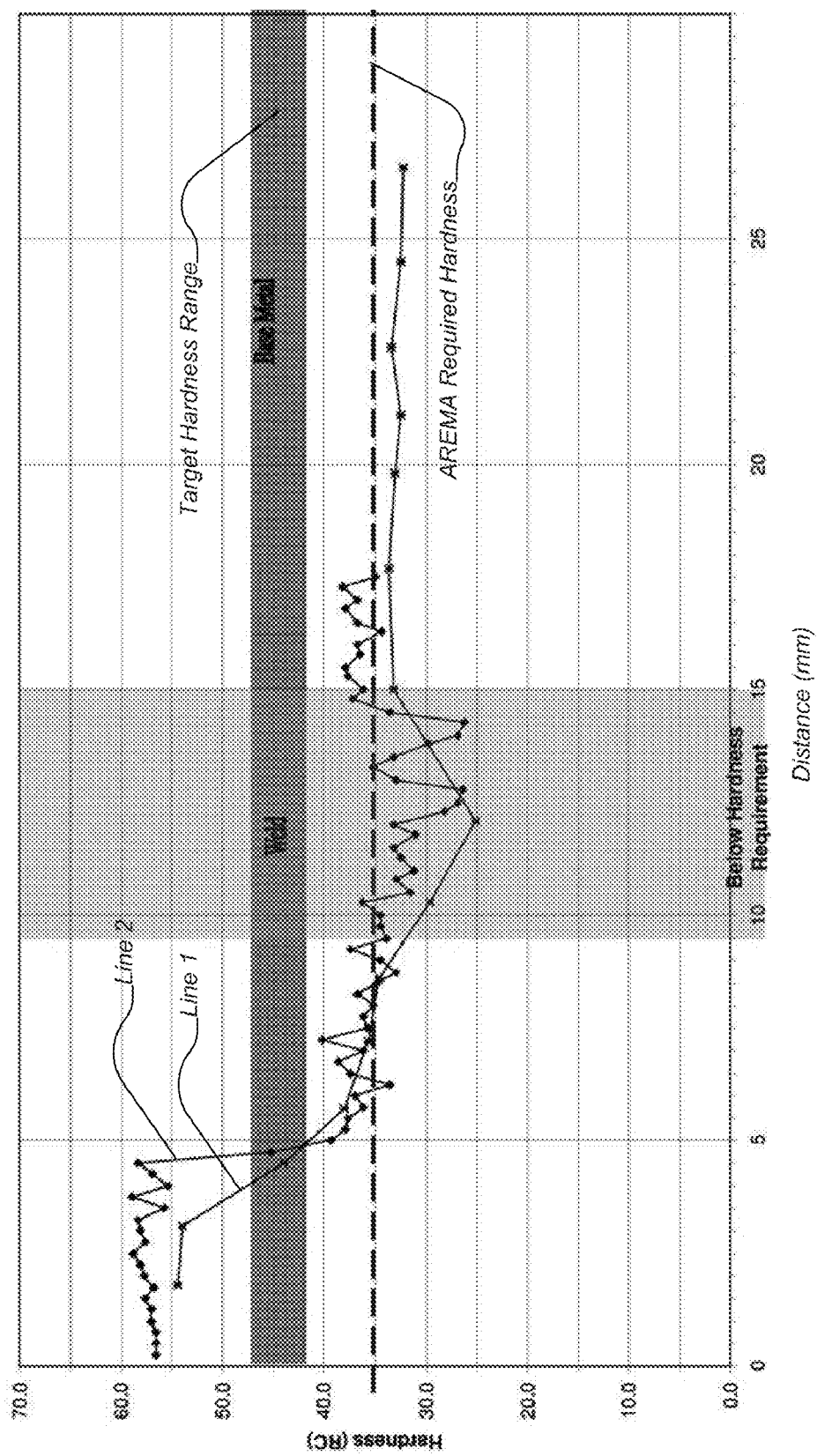
FIG. 6A shows a graph illustrating hardness versus depth in the rail head shown in FIG. 5 along lines 1 and 3.
Figure 6B:
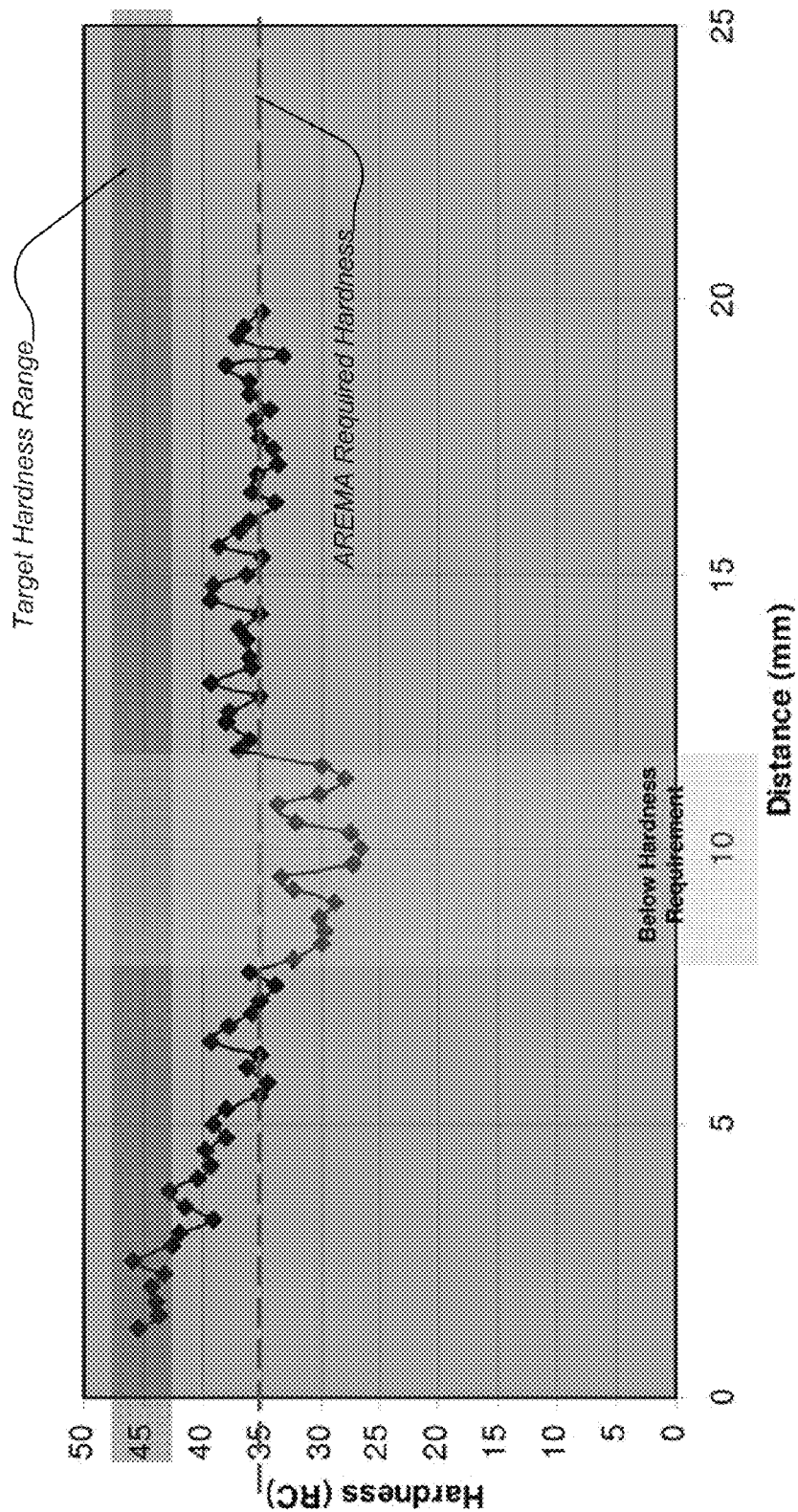
FIG. 6B shows a graph illustrating hardness versus depth in the rail head shown in FIG. 5 along line 2.

FIG. 6A is a graph showing the hardness versus distance from the surface of the rail head 12 along the traverse lines 1 and 3 shown in FIG. 5. As shown therein, the hardness at a depth of between 9 mm and 15 mm, which coincides with where the new metal portion 12B is welded to the base metal portion 12A, is between about 28 RC to abut 36 RC (i.e., about 293 HB to about 351 HB), which is below the AREMA hardness requirement. FIG. 6B is a graph showing the hardness versus distance from the surface of the rail head 12 along the traverse line 2 shown in FIG. 5. Similar to the hardness along the traverse lines 1 and 3 shown in FIG. 6A, the hardness at a depth of between 8 mm and 12 mm is between about 27 RC to about 34 RC, which is also below the AREMA hardness requirement.

In order to increase the hardness and cure/stabilize a heat affected area (HAZ), which is the area of the rail section affected by the heat from the welding step 150, a post-heating step may be carried out (at 160 in FIG. 2) using, e.g., an induction heating equipment having an induction coil (shown in FIGS. 8A and 8B) or the like. The induction heating equipment may be further equipped with a power supply, a transformer and water cooler (not shown). The power supply may be an AC solid-state air-cooled power supply operating at about 35 kW (about 5 to about 50 KHz) and about 480 V (3 phase, about 60 Hz input). The transformer may be a water-cooled and load-matching and rated at about 350 kVA. The water cooler may be an air-to-water fan-cooled dual heat exchanger rated to about 55,000 BTU. The induction heating coil may be water-cooled and the head of the coils may be coated with alumina ceramic to prevent arcing if it contacts a rail section for heating.

The post-heating 160 may be carried out at, e.g., about 1100° F., for a period of time to ensure suitable welding quality. However, the post-heating temperature may vary depending on the weld dimension and/or the like. The post-heating step 160 may be performed substantially immediately after the welding step 150 to temper the existence of martensite without adversely affecting the base parent metal (i.e., pearlite) of the rail section, the structure of the HAZ (i.e., bainite) and/or the like. Weld tempering may also be performed during the posting-heating step at 160 as a function of subsequent layered controlled welds, which may be used to temper the prior weld beads of the multiple welding process. As a result, the surface hardness of the welded metal surface may be about 410 HB to about 450 HB, thereby not only meeting the AREMA hardness requirements but also exceeding the original rail surface hardness by, e.g., approximately 50%. Thus, an anticipated wear life of the restored rail section or a new rail section may be substantially increased.

Figure 7:
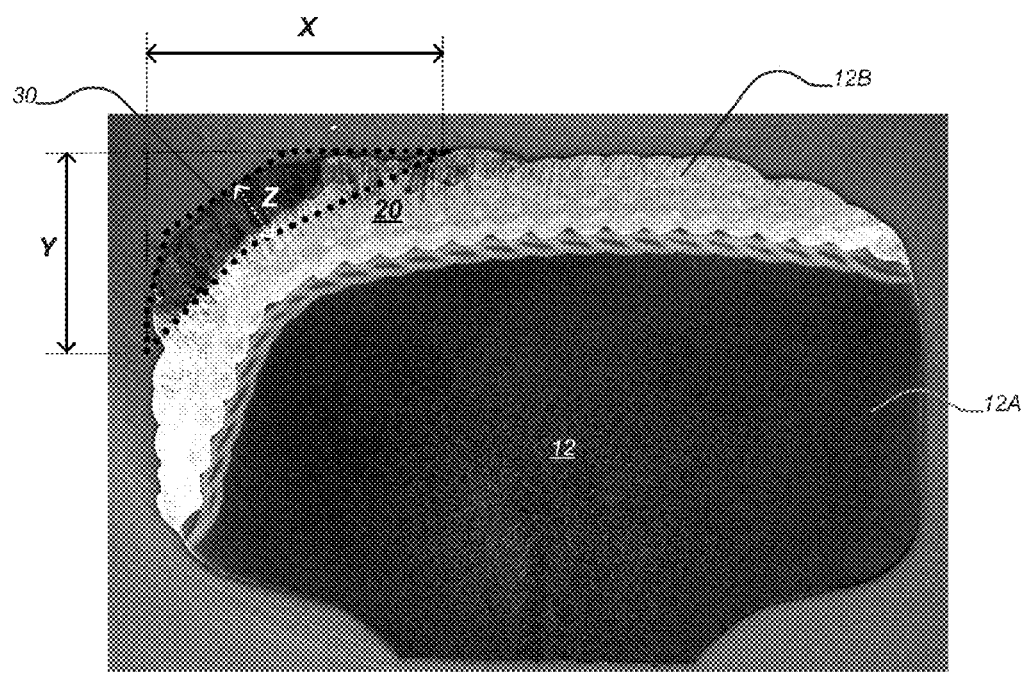
FIG. 7 shows a localized post-heating area on the rail head shown in FIG. 5 according to the principles of the disclosure.

For better results, the post-heating step 160 may be localized to a surface area of the rail head 12 where most longitudinal metal layers 20 are stacked together. For example, for the rail head 12 shown in FIG. 4, in which the metal layers 20 are stacked together on the upper and left corner thereof, the post-heating may be localized to a post-heating area 30 located at the upper left corner of the rail head 12 as shown in FIG. 7. The width X, height Y and depth Z of the post-heating area 30 may be about 18.8 mm, about 12 mm and about 3 mm, respectively, for the particular rail head 12 shown in FIGS. 4 and 7. In most cases, the depth Z may be equal to or less than about 5 mm. Other dimensions and configurations are contemplated for the post-heating area 30 depending on how the metal layers 20 are stacked together.

Figure 8A:
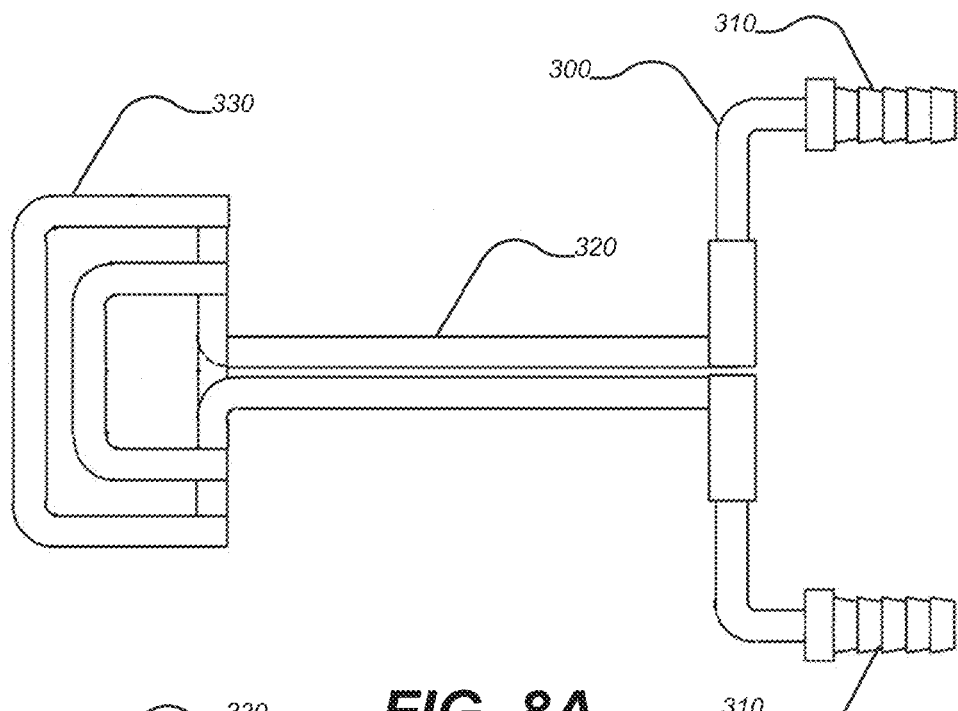
FIGS. 8A and 8B show an induction heating coil constructed according to the principles of the disclosure.
Figure 8B:
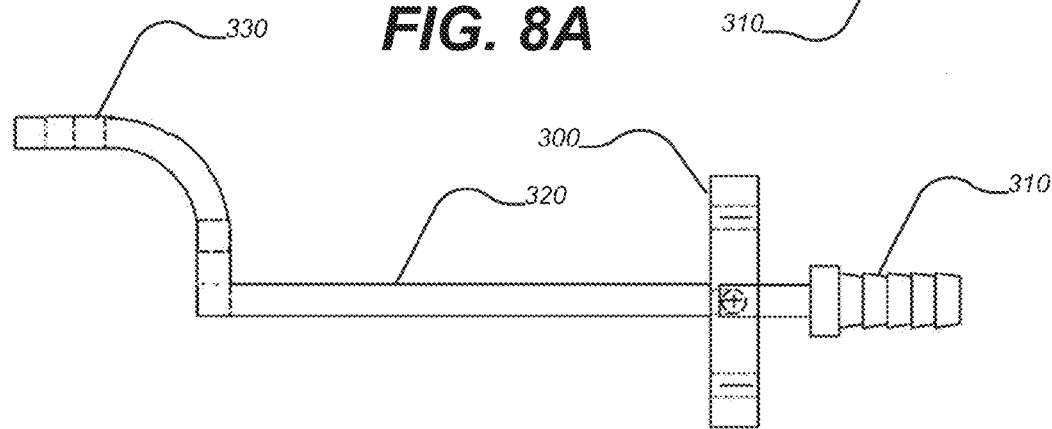

To localize the post-heating, the induction heating coil may be configured to selectively contact or be arranged close to the post-heating area 30. For example, FIGS. 8A and 8B show top and side views of an induction heating coil 300, respectively, constructed according to the principles of the disclosure. The induction coil heating coil 300 may include terminals 310, a neck portion 320 and a head portion 330. The terminals 310 may be connected to the induction heating equipment body that provides thermal energy, which is transferred to the head portion 330 via the neck portion 320. As shown in FIG. 7B, the head portion 330 may be curved to wrap the top left corner of the rail head 12 shown in 7 in order to selectively contact the post-heating area 30 during the post-heating step 160. Depending on an area and shape of the post-heating area 30, the head portion 330 of the induction coil heating coil 300 may be configured differently with different shapes and dimensions.

Referring back to FIG. 2, the rail section may be then shaped (at 170) by, e.g., grinding, milling and/or the like, to a desired rail profile (e.g., a like-new profile, a worn wheel profile or the like) based on, e.g., the curvature of the rail track and/or the like. The restored rail section may be then tested (at 180) using one or more non-destructive testing methods, such as, e.g., ultrasonic testing or the like, to detect internal defects and ensure the rail quality. Once the restored rail section passes the test (at 180), the mobile restoration unit may be withdrawn from the rail track or the restored rail section 10 may be returned to the rail track (at 190) to resume normal service and the process 100 may terminate (at 195). Similarly, a new rail section passing the test would be transported and installed to start service. The restored rail section may be periodically inspected upon resuming normal service.

Figure 3A:
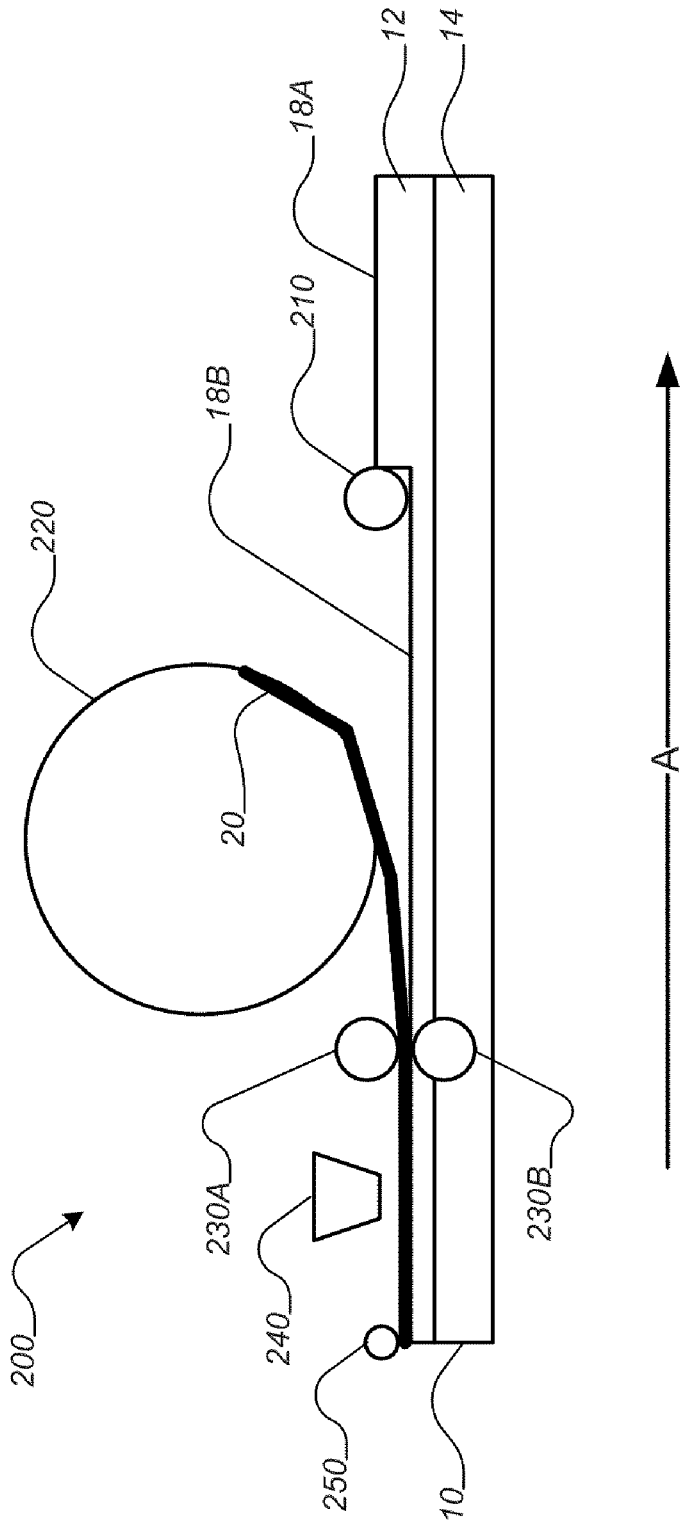
FIG. 3A shows an apparatus for performing the restoration process shown in FIG. 2, constructed according to the principles of the disclosure.

FIG. 3A shows an exemplary configuration of the mobile restoration unit 200 for restoring a worn rail section, such as, e.g., the rail section 10 having a worn rail head surface 18B or the like, constructed according to the principles of the disclosure. The mobile restoration unit 200 may include a pre-welding processing unit 210, a weld-cladding spool 220 and upper and lower weld-cladding wheels 230A and 230B for cladding welding consumables 20, a post-heating unit 240, a post-welding processing unit 250 and/or the like. As noted above, the mobile restoration unit 200 may be mounted on one or more vehicles, such as, e.g., a train, a van, a truck and/or the like. Other configurations and transportation means are contemplated. The mobile restoration unit 200 may pass over the rail section 10 in a direction shown by arrow A and perform the rail restoration process 100 (in FIG. 2) in sequence as it traverses the worn rail head surface 18B.

The pre-welding processing unit 210 may be configured to clean the worn surface portion 18B of the rail section 10 (e.g., cleaning at 130 in FIG. 2), heating the rail section 10 (e.g., preheating at 140 in FIG. 2) prior to welding and/or the like, to ensure consistent welding dimensions, shapes and conditions for welding. To weld new metal on the worn surface portion 12 (e.g., welding 150 at FIG. 2), the weld-cladding spool 220 may feed the welding consumables 225 on to the cleaned worn surface 18B of the rail head 12. The upper weld-cladding wheel 230A may press the welding consumables 20 from above while conducting an electrical current thereto. The electrical current may be returned through the lower weld-cladding wheel 230B, which may move along a bottom of the rail section 10. The weld-cladding wheels 230A and 230B may be, e.g., resistance seam cladding rollers or the like. Subsequently, the post-heating unit 240 may heat the welded rail section 10 (e.g., post-heating at 160 in FIG. 2) to temper the martensite without adversely affecting the base metal of the rail section 10, the HAZ structure and/or the like. The induction-heating equipment mentioned above may be part of the post-heating unit 240. The post-welding processing unit 250 may be configured to perform shaping (e.g., shaping at 170 in FIG. 2), testing (e.g., testing at 180 in FIG. 2) and/or the like. As noted above, the off-line restoration facility may be also equipped with the same or similar equipment and operated in the same or similar principles.

FIG. 3B shows another apparatus 200' for performing the rail restoration process 100 shown in FIG. 2, constructed according to the principles of the disclosure. The apparatus 200' may be a mobile restoration unit or a stationary restoration unit. The mobile apparatus 200' may pass over a worn rail section 10' in a direction shown by arrow A' and sequentially perform at least some of the steps of the rail restoration process 100 shown in FIG. 2. The apparatus 200' may perform the restoration process partially at the spot and partially at the off-line restoration facility.

The apparatus 200' may include a preparation unit 210', a pre-heating unit 212', a welding unit 220', a post-heating unit 240', a finalizing unit 250' and/or the like. The preparation unit 210' may perform the cleaning step 130 in FIG. 2, which may include, e.g., cleaning, grinding and/or the like. The pre-heating unit 212' may perform the preheating step 140 in FIG. 2. The pre-heating unit 212' may include a power supply, a heating coil and the like for a high frequency preheating treatment.

The welding unit 220' may perform the welding step 150 in FIG. 2. The welding unit 220' may include a single unit or multiple-ganged continuous spool wire feed longitudinal welder that may operate under an inert gas shield. The welding unit 220' may place multiple beads of weld material onto the prepared and preheated surface of the rail section 10'. During the welding step 150, the rail section 10' may remain stationary and the welding unit 220', which may be a single welder or multiple welders, may move over the rail section 10'. Alternatively, the welding unit 220' may stay stationary and the ail section 10' may move past the welding unit 220'. For example, when the apparatus 200' is a mobile restoration unit, the welding unit 220' may perform the welding step 150 while moving over the rail section 10'. When the apparatus 200' is stationary, the rail section 10' may move past the welding unit 220'.

The post-heating unit 240' may perform the post-heating step 160 in FIG. 2. The post-heating unit 240' may include a power supply, a heating coil and/or the like for a high-frequency post-heating treatment. The finalizing unit 250 may perform the shaping step 170 in FIG. 2, which may include, e.g., final milling, grinding and/or the like to restore an original rail profile or to form a desired rail profile.

As noted above, the rail restoration process 100 may be applied to manufacturing new rail sections. For example, a base metal layer may be treated to expose a clean metal surface that is free of cracks and profile discontinuities. The treated base metal layer may be then pre-heated prior to welding, and one or more continuous metal layers may be welded on the clean surface of the base metal layer to form a new metal portion thereon. Immediately after the welding, the new metal portion may be heated again to cure the heat-affected zone. Then the new metal portion and/or the base metal layer may be shaped to a desired rail profile. The pre-heating and the posting heating parameters may be the same with or similar to those describe above for restoring a worn rail section. However, depending on the shape and configuration of the base metal layer, the number and area of the continuous metal layers welded on the base metal layer may vary. Thus, the post-heating may be localized to more than one surface portion or, alternatively, the post-heating may be performed evenly on the entire surface of the new metal layer.

The rail restoration and/or new rail manufacturing process according to the principles of the disclosure may reduce costs and limit or reduce the need for purchasing, installing, and maintaining new rails while improving anticipated wear life. New rail tracks require periodic grinding due to metallic plastic flow thereof, but the restored ail sections and new rails manufactured according to the disclosure may require less frequent grinding due to its hardened rail surface. Also, the rail restoration process may substantially increase the service life, e.g., about three times or more. Furthermore, the restored rail section may be safer due to the retention of the critical track gage dimension (e.g., 56.5 inches between wear faces of rails) in curves. Furthermore, the process described herein may also be used in conjunction with new rails to increase the service life thereof.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed is:

1. A method for restoring a worn rail section, comprising:
   cleaning a worn surface of a rail section to expose a clean metal surface;
   heating the rail section to a first temperature before welding;
   welding new metal on the clean metal surface of the rail section after heating the rail section to the first temperature;
   heating the rail section to a second temperature after the welding to heat-treat a heat-affected area caused by the welding; and
   shaping the rail section,
   wherein the welding is performed by a gas metal arc welding (GMAW) process.

2. The method of claim 1, wherein the first temperature is between about 800° F. and about 1000° F.

3. The method of claim 1, wherein the shaping comprises establishing one of a semi-new profile and a worn wheel profile.

4. The method of claim 1, wherein the welding is performed by pulsed-spray GMAW (P-GMAW).

5. The method of claim 1, wherein the welding comprises applying a plurality of longitudinal layers of continuous weld metal in stacks on the dean metal surface of the rail section.

6. The method of claim 5, wherein the second temperature is about 1100° F.

7. The method of claim 6, wherein the heating after the welding is performed substantially immediately after the welding.

8. The method of claim 5, wherein the heating after the welding is localized to a portion of a surface of the rail section where the plurality of longitudinal layers are stacked.

9. The method of claim 8, wherein a hardness of the heat-affected area after the heating after the welding is about 410 HB to about 450 HB.

10. The method of claim 8, wherein the heating after the welding comprises heating the rail section with an induction coil configured to selectively heat the portion of the surface of the rail section where the plurality of longitudinal layers are stacked.

11. The method of claim 1, wherein the cleaning comprises at least one of grinding and milling to expose the clean metal surface that is free of cracks and profile discontinuities.

12. The method of claim 1, further comprising inspecting a plurality of rail sections to identify a worn rail section for restoration.

13. The method of claim 12, further comprising removing and transporting the worn rail section to a restoration facility for restoration.

14. The method of claim 12, further comprising dispatching a mobile restoration unit to a rail track having the worn rail section.

15. The method of claim 14, wherein the mobile restoration unit performs the cleaning, the heating before the welding, the welding, the heating after the welding and the shaping in sequence while moving along the rail track.

16. A method of manufacturing a rail section, comprising:
    exposing a clean metal surface of a base metal layer, the surface being free of cracks and profile discontinuities;
    pre-heating the base metal layer to a first temperature;
    welding one or more continuous metal layers on the clean metal surface of the base metal layer after the pre-heating; and
    post-heating the one or more continuous metal layers welded on the base metal layer at a second temperature, wherein the welding is performed by a gas metal arc welding (GMAW) process.

17. The method of claim 16, wherein the post-heating is localized to an area of the surface of the where a plurality of longitudinal layers of the continuous weld metal are stacked.

18. The method of claim 16, further comprising shaping to a desired rail profile.

* * * * *